United States Patent
Pangburn

[11] 3,870,909
[45] Mar. 11, 1975

[54] MOUNTING MEANS FOR STANDARDIZED DYNAMOELECTRIC MACHINES

[75] Inventor: William Walrath Pangburn, Pattersonville, N.Y.

[73] Assignee: General Electric Company, Schenectady, N.Y.

[22] Filed: Aug. 3, 1973

[21] Appl. No.: 385,454

[52] U.S. Cl. .................................. 310/91, 248/14
[51] Int. Cl. ............................................ H02k 5/00
[58] Field of Search ........... 310/91, 85, 89, 42, 254, 310/66, 258; 248/14, 23, 19, 16; 174/52, 58

[56] References Cited
UNITED STATES PATENTS
| | | | |
|---|---|---|---|
| 3,501,660 | 3/1970 | Wightman | 310/258 |
| 3,544,820 | 1/1969 | Wightman | 310/89 |

FOREIGN PATENTS OR APPLICATIONS
| | | | |
|---|---|---|---|
| 504,653 | 2/1974 | Belgium | 310/91 |
| 627,886 | 2/1963 | Belgium | 310/91 |
| 836,216 | 4/1952 | Germany | 310/91 |
| 857,094 | 5/1950 | Germany | 310/91 |

*Primary Examiner*—R. Skudy
*Attorney, Agent, or Firm*—Vale P. Myles

[57] ABSTRACT

A mounting is provided for standardized dynamoelectric machines, which enables two different sizes of machine core elements to be mounted in a single standard machine housing while maintaining the external dimensions of the machine mounting means in exact compliance with established standards for both machine sizes. The foregoing objective is attained by providing mounting feet on the machine with specially spaced mounting apertures that are usable in a designated manner to enable the machine to be mounted on standardized mounting frames when either of two standard machine frame sizes are selected for the machine being mounted.

4 Claims, 4 Drawing Figures

MOUNTING MEANS FOR STANDARDIZED DYNAMOELECTRIC MACHINES

BACKGROUND OF THE INVENTION

In the manufacture of electric motors and generators it has long been a common practice to adhere to certain established standardized dimensions so that the machine can be readily used with, or interchanged with, pre-existing machines that are already in service. One of the more widely followed published standards for such electric machines is that prepared by the National Electrical Manufacturers Association (hereinafter NEMA). Among numerous other standardized machine dimensions, this published NEMA standard establishes certain standardized dimensions for the mounting means to be used on foot-mounted machines. These standardized mounting means dimensions are keyed to a selected number of standardized machine frame designations or frame sizes. In addition, the NEMA standard for foot-mounted machines establishes a standard relationship between certain machine frame sizes and designated pairs of machine-foot mounting dimensions.

As will be explained more fully during the following description of the invention, one known manufacturing method for adapting an electric motor frame to accommodate core elements corresponding to given pairs of standard motor frame sizes, while maintaining the motor mounting means in accordance with standard dimensions estabilished for the two frame sizes, is to cast a motor frame to accommodate one of the standard frame sizes, then cut off both ends of the frame a pre-determined amount in order to adapt it to receive the other frame size core elements. In practicing this method of manufacture, the original motor frame is provided with mounting feet that have two separate complete sets of mounting apertures provided therein. These two sets of mounting apertures are, respectively, positioned standard distances from the ends of the motor housing, i.e., in its original cast form, or in its adapted (cut-off) form, wherein the respective ends of the housing have been removed by a cutting operation. While this prior art method of adapting a single frame to accommodate the core elements of two different standardized frame sizes is relatively widely used because of the cost advantages inherent in it, it does have the disadvantage of requiring the cutting operations described above. It is apparent that it would be desirable to provide a means for attaining the desirable objective of having a single motor frame that will accommodate the core elements of two standardized motor frame sizes while at the same time, maintaining the mounting dimensions of the frame consistent with established standard dimensions, for both frame sizes.

A primary object of the present invention is to provide a mounting means for a dynamoelectric machine, such as an electric motor, which is operable to enable core elements of two different motor frame designations to be mounted within a single frame element while maintaining the mounting dimensions of the frame in accordance with established industry standards.

Another object of the invention is to provide an improved method for manufacturing electric motor housings and mounting means that afford lower manufacturing costs and greater efficiency of production than has heretofore been known.

A further object of the invention is to provide an improved mounting means for dynamoelectric machines.

Additional objects and advantages of the invention will be apparent to those skilled in the art from the disclosure of it that follows, taken in combination with the attached drawings.

SUMMARY OF THE INVENTION

In one preferred embodiment of the invention, a housing for an electric motor is provided with two pairs of mounting feet secured to the housing at spaced apart points on the base thereof. Two suitable apertures are formed in each of the feet to receive therethrough conventional mounting studs or bolts. Pursuant to the invention, the mounting apertures in each of the feet are spaced apart in a pre-determined manner such that established standard dimensions are maintained between the respective mounting apertures and other designated reference points on the motor housing when motor core elements for either of two standard motor frame sizes are mounted within the housing. More specifically, the two apertures closest to the drive shaft end of the motor housing are spaced a standard distance from a designated location on the drive shaft. In addition, these two apertures are spaced, respectively, standard distances from the two pairs of mounting apertures positioned in the mounting feet at the other end of the motor housing.

DESCRIPTION OF A PREFERRED EMBODIMENT

Figure 1:
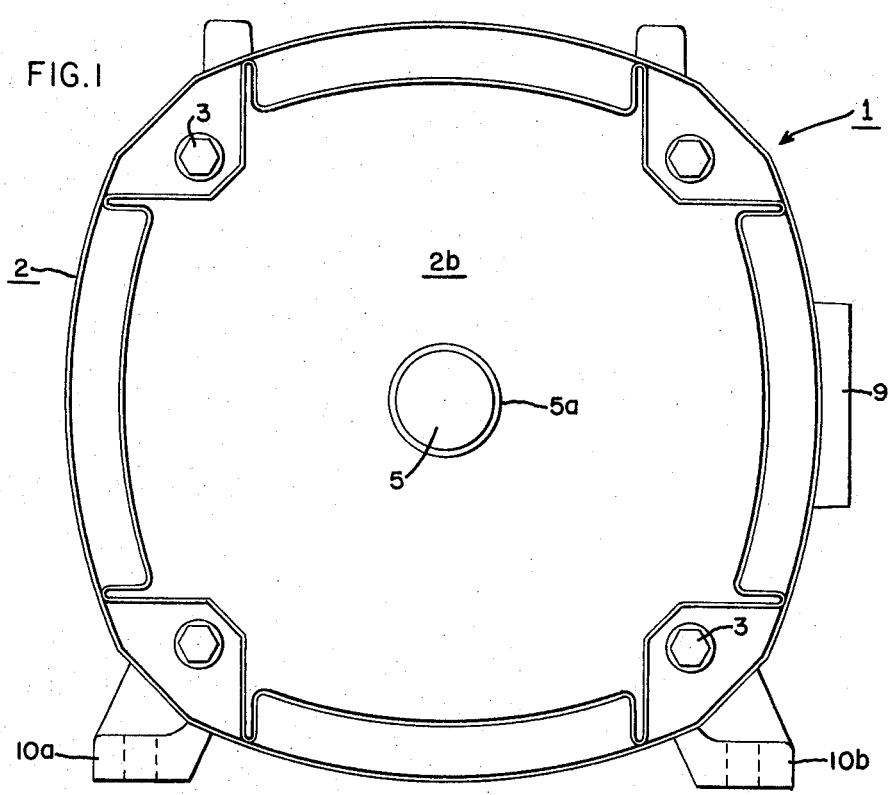
FIG. 1 is an end view of a dynamoelectric machine, such as an A.C. electric motor, having motor mounting means constructed according to the teaching of the present invention.
Figure 2:
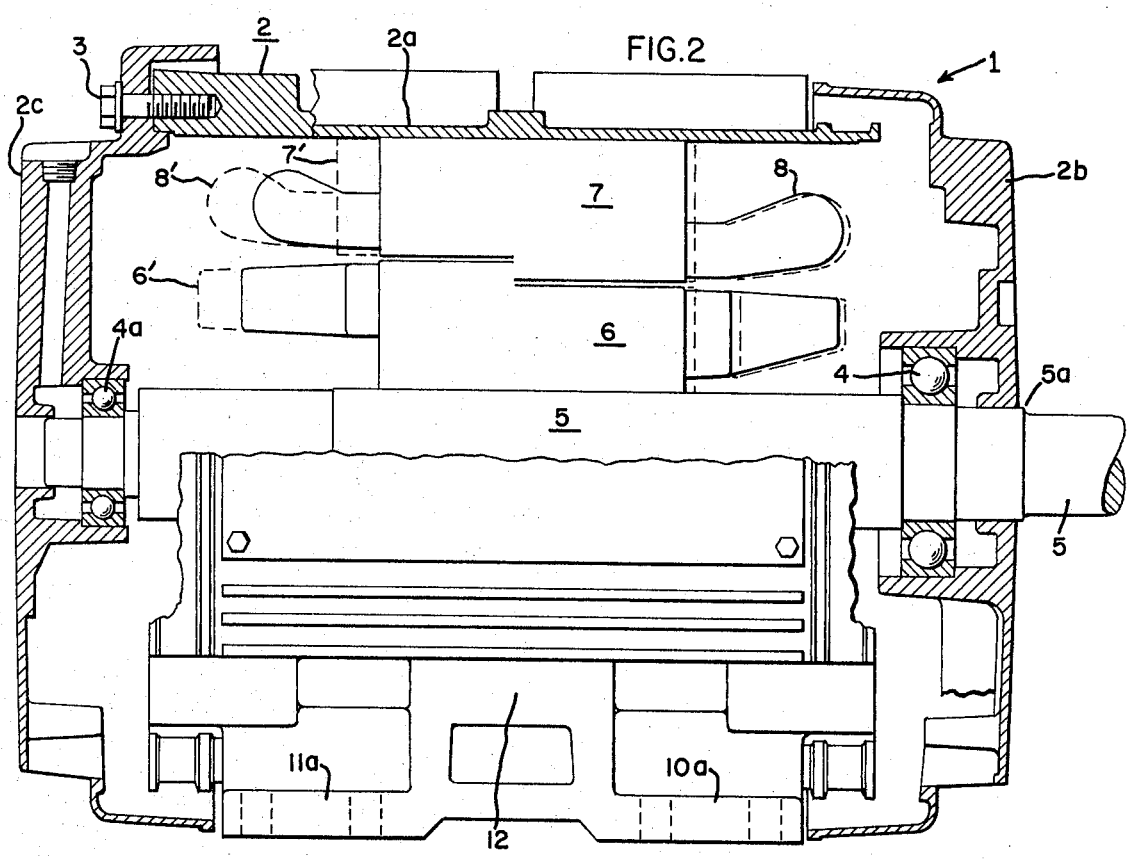
FIG. 2 is a side elevation view, partly in cross-section, of the machine shown in FIG. 1.

To facilitate a thorough disclosure of the invention, it will be described in relation to a standardized type of A.C. electric motors; however, it will be apparent from the disclosure that the invention may be utilized on other types of dynamoelectric machines. Referring now to FIGS. 1 and 2 of the drawings, it will be seen that there is shown an electric motor 1 comprising a fairly well-known type of housing 2 that is formed of an elongated, hollow center portion 2a (best seen in FIG. 2) and a pair of bell-shaped end caps 2b and 2c. Any suitable mounting means, such as the bolts 3, shown in FIG. 2, may be used to mount the end caps 2b and 2c, respectively, on opposite ends of the hollow center-portion 2a of the housing 2. A pair of ball bearings 4 and 4a are mounted respectively on the end caps 2b and 2c in conventional sleeves, as illustrated in FIG. 2. Rotatably mounted within the pair of bearings 4 and 4a is a steel drive shaft 5 that is formed to have a shoulder 5a adjacent the end thereof that extends through the bearing 4 and beyond the end of housing end cap 2b.

It should be understood at this point that various different kinds of drive shafts may be used in practicing the present invention, which shafts do not incorporate a shoulder, such as the shoulder 5a. However, as will become apparent from the description of the invention that follows, the shoulder 5a is used to establish one of the standard dimensions commonly set forth in industry standards for electric motor mounting means. Accordingly, when the invention is applied on motors having drive shafts that do not incorporate such a shoulder, it will be understood that equivalent standard spacing measures are intended when reference is made herein to "a shoulder" to describe the spacing dimensions of the mounting means of the invention with respect to the drive shaft and motor housing end frame.

A suitable electric motor rotor element 6 is mounted on the drive shaft 5 in any well-known manner, and a stack of stator laminations 7 having conventional motor windings 8, positioned in typical stator slots thereof, is mounted in fixed relation on the central portion of the housing 2a, around the rotor element 6. To understand the present invention, it must be appreciated that various standard sizes of core elements such as the rotor element 6 and stator assemblies 7 and 8 may be accommodated within the housing 2 in order to enable machine elements corresponding to different standard motor frame size designations to be used with the housing 2. In general, when such different sized motor core elements are utilized, a longer stack of stator laminations (7) will be used and corresponding longer windings (8) may be mounted therein. These alternative dimensions are shown in phantom by the designation for the stator lamination 7' and for the alternative winding 8'. In like manner, an alternate, longer rotor 6' is shown by dotted lines in FIG. 2.

In addition to the motor components referenced above, the motor 1 is provided with a conventional conduit box 9 mounted on one side of the exterior thereof. Two pairs of mounting feet 10a – 10b and 11a – 11b are mounted in spaced apart relation on the housing central portion 2a (also see FIG. 3). In the illustrated form of the invention, the feet 10a – b and 11a – b are supported from a centrally located section 12, best seen in FIG. 2; however, it will be readily understood that various alternative mounting means for these mounting feet may be used in other forms of the invention. Each of the mounting feet is positioned to coincide generally with the respective corners of a rectangular plane that may be disposed tangential to the base of the housing central portion 2a, as is illustrated in FIGS. 1 and 2.

Figure 3:
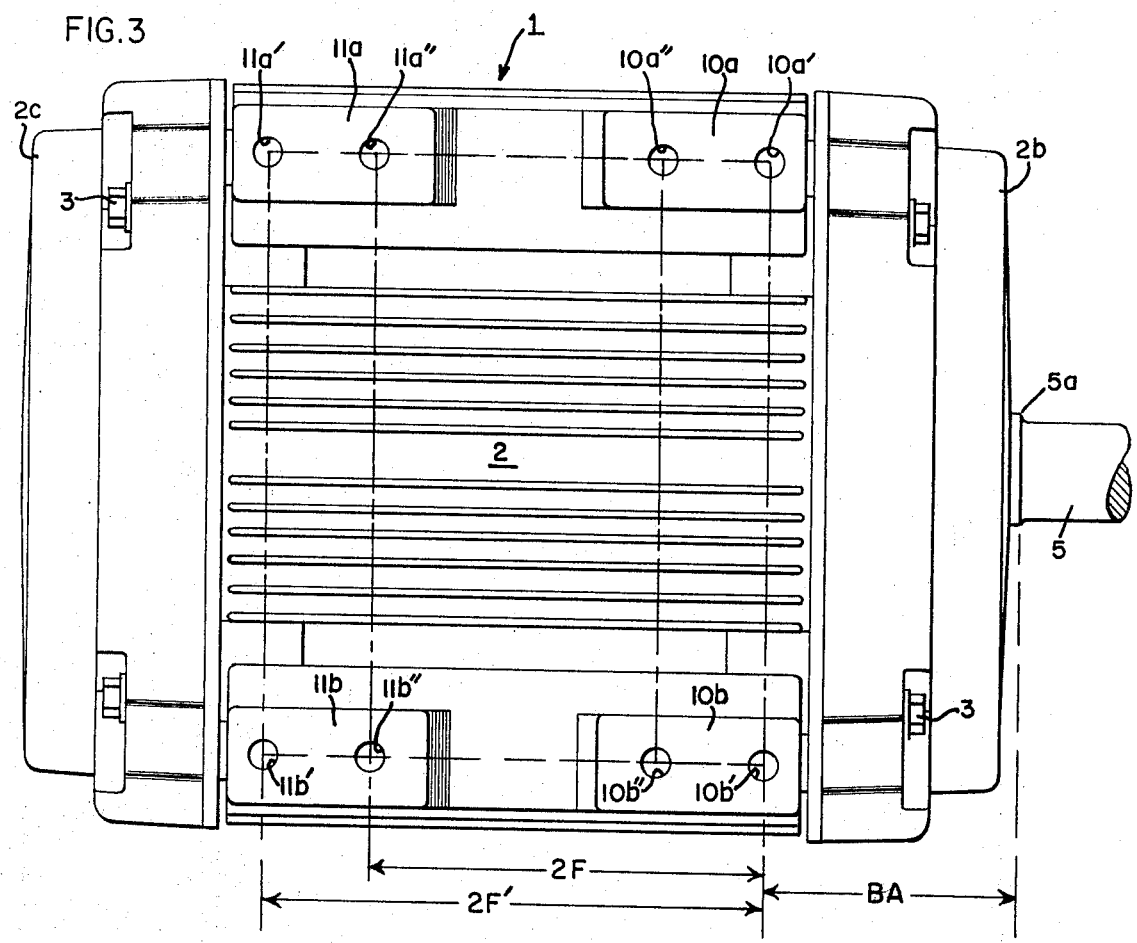
FIG. 3 is a bottom plan view of the machine shown in FIGS. 1 and 2, illustrating the mounting feet and the arrangement of the mounting apertures formed therein pursuant to the invention.

Suitable wall means are used to define two apertures through each of the mounting feet, respectively. These mounting apertures are identified in aligned matched pairs by the numbers 10a' – 10b', 10a'' – 10b'', 11a' – 11b', and 11a'' – 11b''. As is best seen in FIG. 3, all of the apertures in the two feet on respectively opposite sides of a plane through the longitudinal axis of the drive shaft 5 are positioned in alignment with one another. Moreover, it will be seen that the centers of the four outermost apertures 10a', 10b', 11a' and 11b' are arranged to define the corners of a first rectangle, shown by the dot-and-dash lines in FIG. 3. In like manner, the centers of the four innermost apertures 10a'', 10b'', 11a'' and 11b'' are arranged to define the corners of a second rectangle, which is shown by the dotted lines in FIG. 3.

Before proceeding further with a more detailed description of the structure and operation of the present invention, it should be pointed out that motor industry standards of the type referred to at the outset, such as those propounded by NEMA, establish certain standard dimensions and component spacing relationships that must be maintained for the mounting means and associated drive shafts of electric motors. In particular, such standards require a pre-determined distance BA (see FIG. 3) to be maintained between a drive shaft shoulder (or its equivalent as defined above) and a plane through the centers of the nearest mounting apertures; when a given motor frame size is specified. Also, for such a specified motor frame size, a fixed distance 2F (see FIG. 3) is set for the length between the centers of the pairs of mounting holes that are used in adjacent mounting feet to secure the motor in operating position These industry standards further provide that certain specified pairs of frame size designations will have the same standard pre-determined distance BA, but will have correspondingly different fixed distances 2F between their respective pairs of mounting apertures. Although there are several such pairs of designated frame sizes specified by the industry standards, a few examples of such related pairs will suffice to help clarify the unique features of the present invention. Thus, for example, the industry standards establish that for a frame size designation of 143, the standard 2F dimension is 4 inches and the standard BA dimension is 2.25 inches. In the "paired" (i.e., with frame size 143) frame size designation of 145, the 2F dimension is 5 inches, while the BA (or "pairing") standard dimension remains 2.25 inches. In the next larger "paired" frame designation sizes 182 and 184, the common standard BA dimension is 2.75 inches whereas for the 182 frame size, the 2F dimension is 4.50 inches and for the 184 frame size the standard 2F dimension is 5.5 inches.

Figure 4:
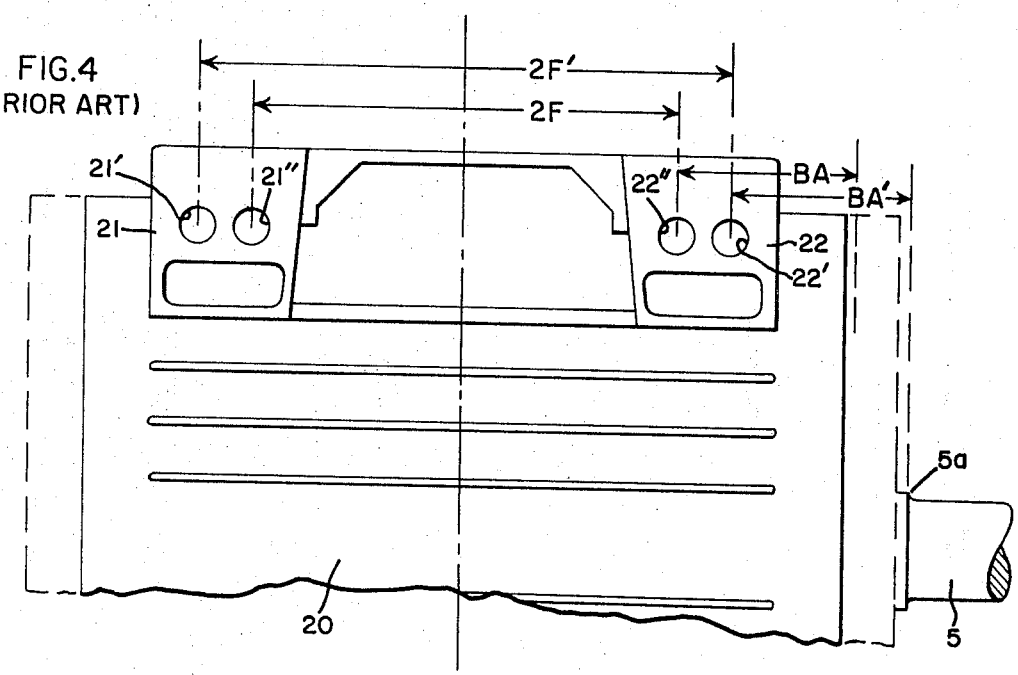
FIG. 4 is a fragmentary bottom view of a prior art form of electric motor mounting means, including a pair of mounting feet having spaced-apart mounting apertures formed therein, in the well-known manner generally outlined above.

The manufacturing economies that can be realized from using a single frame casting to accommodate core elements for motors of the "paired" frame sizes has long been recognized, as indicated above. Referring now to FIG. 4 of the drawings, the conventional prior art means for adapting a given frame to accommodate two different standard frame size designated core elements will be described. Pursuant to this known method, a motor frame 20 is provided with a conventional matched pair of mounting feet, two of which feet are shown at 21 and 22. Suitable wall means are used to define spaced apart pairs of apertures in each of the feet such as, for example, the apertures 21' and 21'' in foot 21 and apertures 22' and 22'' in foot 22. The outermost apertures 21' and 22' are spaced apart by the standard pre-determined distance 2F' and the innermost apertures 21'' and 22'' are spaced apart by the second standard distance 2F. In its originally cast form, the motor housing 20 would be shaped to have an overall length as shown by the dotted lines at opposite ends of the housing 20. Thus, when a conventional drive shaft, such as the drive shaft 5 is mounted in the motor housing, its shoulder 5a will extend a given distance beyond the end of the housing 20. It should be understood that although separate end caps for housing 20 are not shown in FIG. 4, such end caps may be used in given applications, but the spacing of shoulder 5a relative thereto would still need to be standardized.

In practicing this prior art manufacturing method, when a large frame size of a given standardized "pair"

of frame sizes is selected, the motor housing 20 would be left in its original form, i.e., so that its length is equal to that shown by the dotted lines in FIG. 4. Thus, the drive shaft shoulder 5a would be spaced a desired standard distance BA' from the center of the closest mounting hold 22'. Alternatively, if the smaller motor size designation of the "pair" of frame sizes having BA dimension equal to the distance BA' were selected for the frame 20, the ends thereof would be cut off by suitable cutting operations so that frame 20 would have the overall length shown in solid lines in FIG. 4. Thus, the shoulder 5a on drive shaft 5 would be spaced a desired standard distance BA from the closest mounting aperture 22'' in the innermost set of apertures. Of course, the dimensions BA and BA' would be equal due to the selected pairing of frame sizes.

Now, with the foregoing description of motor industry motor standard dimensions in mind, along with an awareness of the best prior art method heretofore known for accommodating the manufacture of machines to such standards, reference is again made to FIG. 3 of the drawings to continue a detailed description of the present invention. Pursuant to the invention, the centers of the two apertures 10a' and 10b' are positioned such that a plane through their respective centers is spaced a pre-determined distance BA from the shoulder 5a on the drive shaft 5 when it is operably mounted in housing 2. Also, the centers of the apertures 10a' and 10b' are, respectively, spaced a fixed distance 2F from a plane through the centers of the two apertures 11a'' and 11b'' at the corners of the second, or innermost, rectangle described above. Finally, the sides of the first rectangle defined by the centers of apertures 10a', 10b', 11a' and 11b', which sides are parallel to the longitudinal axis of drive shaft 5, are each established to have a pre-determined length 2F'. It will be appreciated that in practicing the invention, the selected distances 2F and 2F' and the length BA will correspond to "paired" motor frame designations set forth in the industry standards, in the manner described above.

In practicing the invention with the disclosed embodiment, it should be readily apparent from the foregoing description that when the motor 1 is to have mounted therein core elements corresponding to a larger frame size of a "pair" of frame sizes having equivalent BA standard dimensions, only the mounting apertures pairs 10a' − 10b' and 11a' −11b' separated by the distance 2F' will be utilized to mount the motor. Alternatively, if the smaller of the "paired" frame size designations is used to establish the core elements used in the motor 1, only the mounting apertures, pairs 10a' − 10b' and 11a'' − 11b'', separated by the distance 2F will be utilized. Accordingly, it should be clear that the standard dimension BA is maintained in both cases, without requiring any separate cutting operations on the frame of motor 1, such as that described above with reference to prior art manufacturing techniques. Specifically, it will be noted that the pair of mounting apertures 10a' − 10b' closest to the extended end of drive shaft 5 are used in both cases, so the distance BA must remain constant.

From the disclosure and operation of the invention set forth above, it will be apparent that the invention may be practiced without utilizing the pair of mounting apertures 10a'' and 10b''. Thus, in some embodiments of the invention, these apertures might be omitted without departing from the true spirit and scope thereof. In the preferred embodiment of the invention, however, this additional pair of mounting apertures is provided in the unique relationship described above wherein the axially outermost ends of the first and second rectangles are spaced apart a distance equal to 2F' − 2F at both ends thereof. This arrangement enables the preferred embodiment of the invention to readily accommodate situations in which the motorhousing 2 might be turned to provide convenient access to the conduit box 9 on either side thereof. It can be seen that in such an arrangement it may be desirable to utilize a drive shaft extending through the opposite end, i.e., end cap 2c, of the housing 2. In such an alternative embodiment, the standard dimension BA would be established between the shoulder 5a and a plane through the centers of apertures 11a' and 11b'. In that arrangement, the length 2F' would remain the same (as in the case where the shaft extends from the other end of the motor) if a large motor frame designation were selected, but the second standard length 2F would not be established between planes, respectively, through the centers of the pair of apertures 11a' − 11b' and the apertures 10a'' − 10b'', when a smaller frame size is selected. Thus, in this case, the apertures 11a'' − 11b'' would not be used for mounting motors of either frame size.

Finally, although the invention has been described with reference to a particular relative spacing of the rectangular relationship between the innermost and outermost mounting apertures described above, it will be understood that in some applications of the invention the four sides of the innermost rectangle defined by mounting apertures 10a'', 10b'', 11a'' and 11b'' may each be substantially equal in length. In like manner, in alternative embodiments of the invention, the four sides of the outermost rectangle defined by the four other mounting apertures may each be substantially equal in length. Moreover, those skilled in the art will understand that various other modifications and alternative forms of the invention might be developed from the disclosure of it presented herein. Accordingly, it is my intention to encompass within the scope of the following claims the true spirit and limits of the invention.

What I claim as new and desire to secure by Letters Patent of the United States is:

1. A dynamoelectric machine comprising; a housing having an elongated, hollow center portion and a pair of end caps that are mounted respectively on opposite ends of said center portion, a pair of bearings mounted respectively on said end caps, a drive shaft having a shoulder adjacent one of its ends, said drive shaft being rotatably mounted on said bearings with one end of said shaft extending through one of the end caps and beyond the housing, a rotor element mounted on the drive shaft for rotation therewith, a stator assembly mounted within said housing around the rotor element, two pairs of feet mounted in spaced apart relation on the housing center portion, each of said feet being positioned to coincide generally with the respective corners of a rectangular plane tangential to the base of said housing center portion, wall means defining two apertures through each of said feet, all of the apertures in the two feet on respectively opposite sides of a plane through the longitudinal axis of said drive shaft being positioned in alignment with one another, with the centers of the four outermost apertures defining the corners of a first rectangle and the centers of the four innermost apertures defining the corners of a second rectangle, and the improvement wherein the midpoint of a straight line extending between the centers of the two apertures nearest the end of said drive shaft extending through said one end cap is spaced a pre-determined distance BA from the shoulder on said drive shaft and is spaced a fixed distance 2F from the midpoint of a straight line extending between the centers of the two apertures at the corners of said second rectangle furthest therefrom, and the sides of said first rectangle parallel to the longitudinal axis of the drive shaft are each a pre-determined length 2F′, said fixed distance 2F and said pre-determined length 2F′ being preselected dynamoelectric machine standard dimensions that are both related to different standard frame size designations that correspond to a common standard pre-determined distance BA.

2. An invention as defined in claim 1 wherein the axially outermost ends of said first and second rectangles are spaced apart a distance equal to 2F′−2F at both ends thereof.

3. An invention as defined in claim 2 wherein the four sides of said innermost rectangle are each substantially equal in length.

4. An invention as defined in claim 2 wherein the four sides of said outermost rectangle are each substantially equal in length.

* * * * *